US007318230B2

(12) United States Patent
Chute et al.

(10) Patent No.: US 7,318,230 B2
(45) Date of Patent: Jan. 8, 2008

(54) MEDIA PLAYER TRAY BEZEL COMPLIANCE COUPLING

(75) Inventors: George E. P. Chute, Milford, MA (US); Allen T. Graff, Sutton, MA (US); Arnold E. Vandoren, Sterling, MA (US)

(73) Assignee: Bose Corporation, Framingham, MA (US)

( * ) Notice: Subject to any disclaimer, the term of this patent is extended or adjusted under 35 U.S.C. 154(b) by 461 days.

(21) Appl. No.: 10/860,919

(22) Filed: Jun. 4, 2004

(65) Prior Publication Data
US 2005/0273794 A1    Dec. 8, 2005

(51) Int. Cl.
*G11B 17/03*    (2006.01)
*G11B 17/04*    (2006.01)
*G11B 33/02*    (2006.01)

(52) U.S. Cl. .................. 720/601; 720/609; 720/613

(58) Field of Classification Search ............... 720/601, 720/609, 611, 613
See application file for complete search history.

(56) References Cited

U.S. PATENT DOCUMENTS

| 2004/0148614 A1* | 7/2004 | Bae ......................... 720/601 |
| 2004/0163094 A1* | 8/2004 | Matsui et al. ............... 720/601 |

FOREIGN PATENT DOCUMENTS

| JP | 2003308685 |   | 10/2003 |
| JP | 2003308685 A | * | 10/2003 |
| JP | 2004014024 A | * | 1/2004 |

OTHER PUBLICATIONS

European Examination Report dated Jul. 10, 2007; issued in European Patent Application No. 05103739.8, filed May 4, 2005.

* cited by examiner

*Primary Examiner*—Craig A. Renner
(74) *Attorney, Agent, or Firm*—Fish & Richardson, P.C.

(57) ABSTRACT

A media player facing has a device housing with a drawer and a facade. The outer surface of the facade and the outer surface of the device housing are aligned so that the facade outer surface and the device housing outer surface are substantially continuous when the drawer is closed.

7 Claims, 4 Drawing Sheets

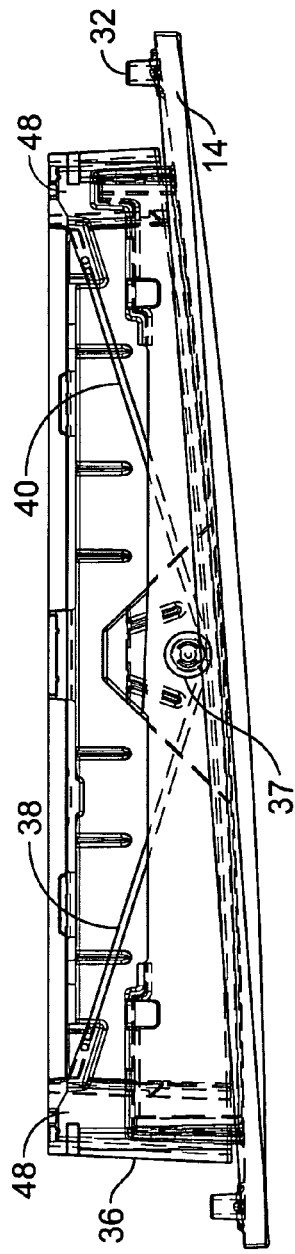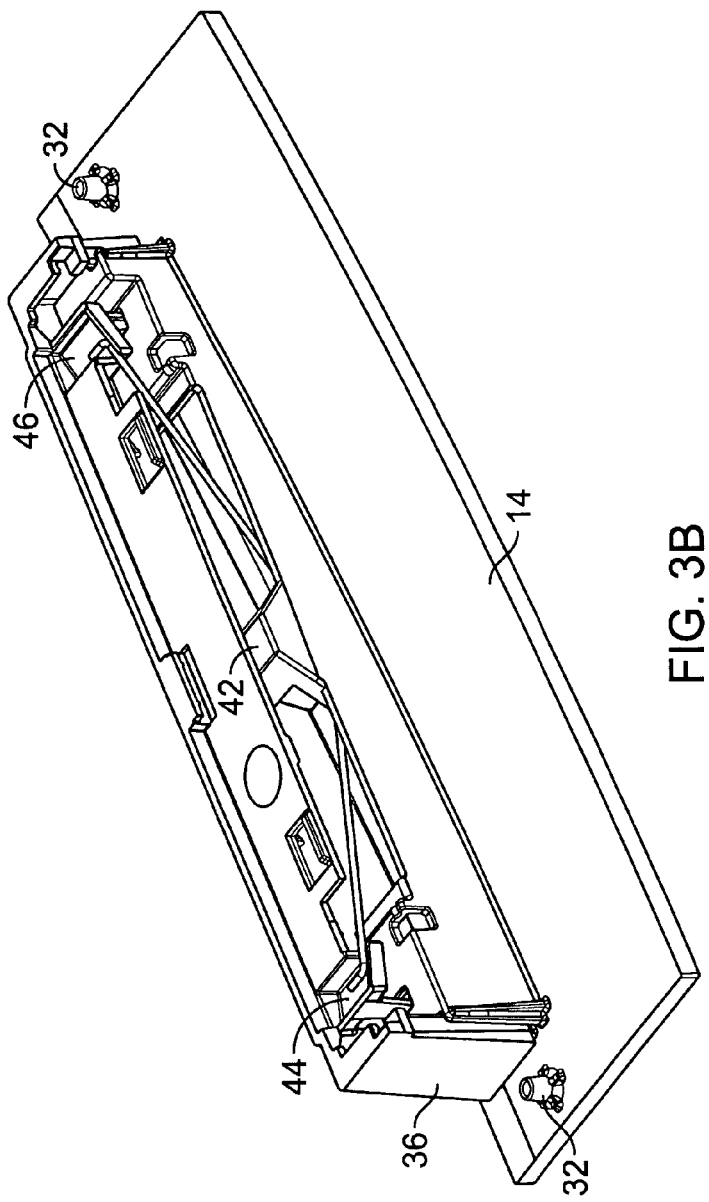
FIG. 3A
FIG. 3B

MEDIA PLAYER TRAY BEZEL COMPLIANCE COUPLING

This invention relates to media player facing, and more specifically to a facade for a drawer in a disc media player.

BACKGROUND OF THE INVENTION

A typical media player, such as a compact disc player or a DVD player, includes a visible mechanical sliding drawer for loading at least one disc. When the drawer is in a closed position the front of the drawer remains visible.

SUMMARY OF THE INVENTION

It is an important object to provide a facade for a media player.

According to an aspect of the invention, a facade for a media player has a device housing, having an outer surface with a first opening and a second opening; said housing further having a faceplate, formed to create a substantially continuous surface with said housing, a drawer, configured to receive media, and movable through said first opening into said device housing, said drawer further being movable between a closed position and an open position, with a base plate connected to one end of said drawer and a spring comprised of a coil portion and at least one arm, said at least one arm coupled to said base plate, with a facade, having an inner surface and an outer surface, said inner surface coupled to said coil portion, wherein the relative distance of said inner surface of said facade and said one end of said drawer is greater in said closed position than in said open position, and wherein, in the closed position, said outer surface of said facade and said outer surface of said device housing are aligned so that said facade outer surface and said device housing outer surface appear substantially continuous.

Other features, objects, and advantages of the invention will be apparent from the following description when read in connection with the accompanying drawing in which:

BRIEF DESCRIPTION OF THE SEVERAL VIEWS OF THE DRAWING

FIG. 3A depicts a cutaway view of a compliance;

FIG. 3B shows another view of a compliance;

DETAILED DESCRIPTION

Figure 1:
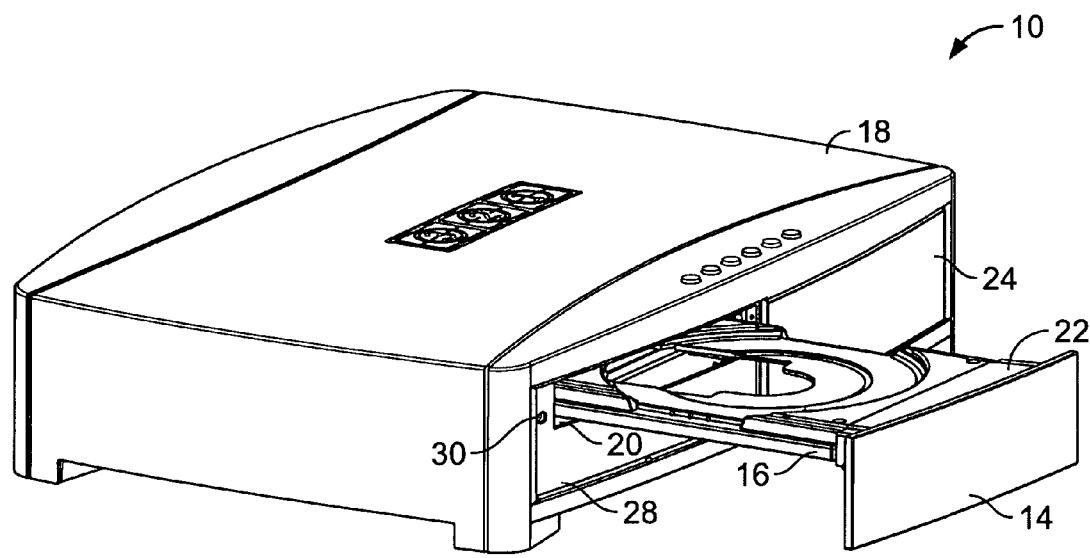
FIG. 1 shows a media drawer in an open position with a compliant facade.
Figure 2:
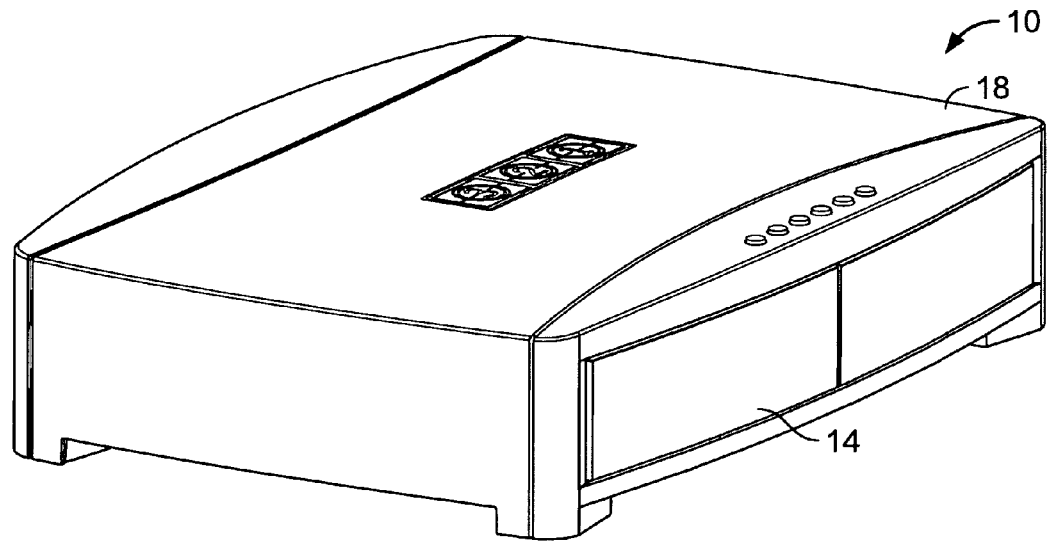
FIG. 2 shows the media drawer in a closed position.

Referring to FIG. 1, compliant facade 10 includes a housing 18 having an outer surface with at least one opening 20. Drawer 16 may be configured to receive media, and may be slidable through opening 20 into housing 18. Drawer 16 is movable between a closed position, shown in FIG. 2, and an open position, shown in FIG. 1. Facade 14 has an inner surface and an outer surface. Housing 18 may include faceplate 24, which may cover a display, and recess 28.

Compliance 22 aligns the inner surface of facade 14 with one end of drawer 16, such that the relative distance of the inner surface of facade 14 and said one end of drawer 16 is greater in the closed position than in the open position. When drawer 16 is in the closed position, the inner surface of facade 14 may seat in recess 28, and the outer surface of facade 14 may be aligned with faceplate 24 so that the outer surface of facade 14 and faceplate 24 appears as one continuous surface.

Figure 3C:
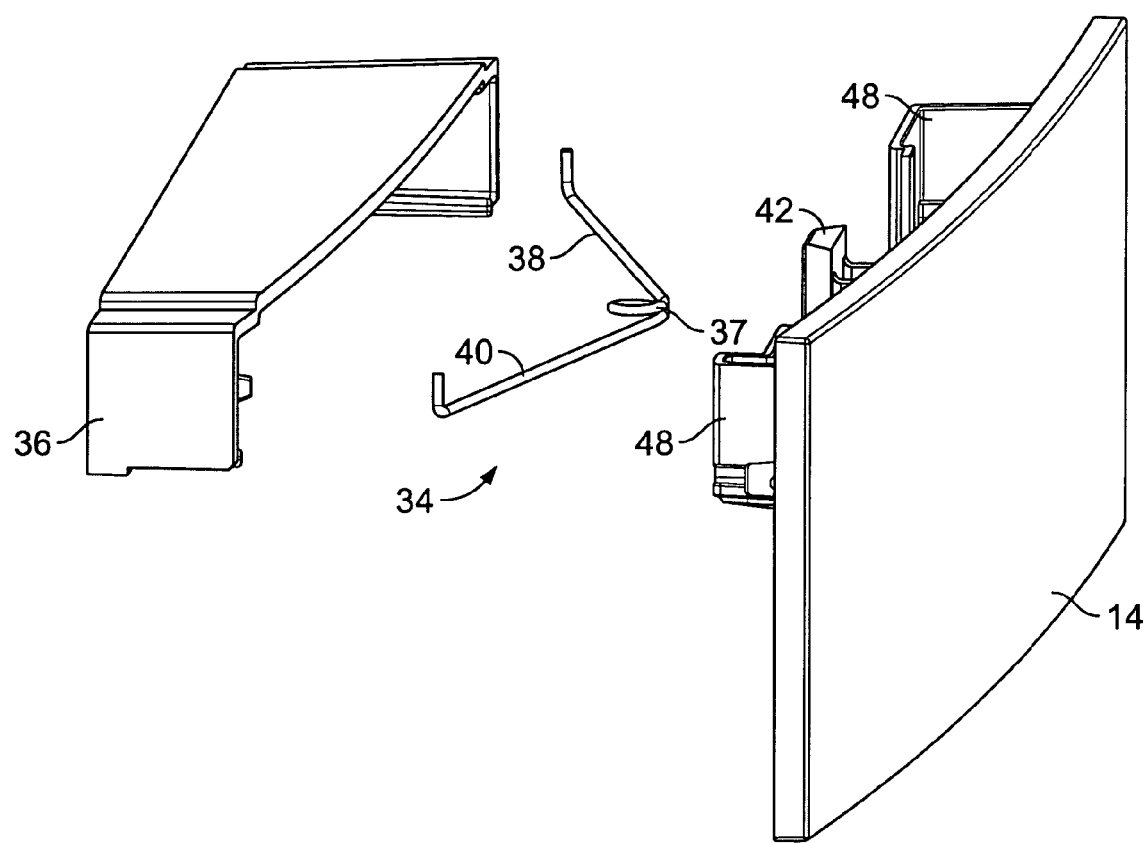
FIG. 3C shows a simplified, exploded view of components of a compliances.

Referring to FIGS. 3A, 3B and 3C, compliance 22 may comprise base plate 36 and spring 34, which couples facade 14 to one end of base plate 36, while another end of base plate 36 connects to one end of drawer 16. Spring 34 comprises a coil portion 37 having arms 38 and 40 extending therefrom. Support member 42 may be molded on the inner surface of facade 14. Support member 42 may capture and support coil portion 37 for securing spring 34 to facade 14. Arms 38 and 40 connect with molded supports 44 and 46, which may be molded on the inside surface of base plate 36. The ends of arms 38 and 40 may be captured by molded supports 44 and 46 to couple spring 34 to base plate 36. At least one portion of the inner surface of base plate 36 may mate with protrusions 48, which may serve to guide the motion of base plate 36 in an axis generally perpendicular to the orientation of facade 14 and to limit motion in other axes. The inner surface of facade 14 may also have at least one guide member 32, which may align with at least one corresponding guide slot 30 in recess 28 to facilitate the alignment of facade 14 when drawer 16 moves into the closed position.

As drawer 16 moves between an open position and a closed position, the relative distance between facade 14 and the end of drawer 16 coupled to base plate 36 may change. As drawer 16 moves into the closed position, facade 14 seats in recess 28, allowing the outer surface of facade 14 to align with faceplate 24. The inner surface of facade 14 may remain in recess 28 while drawer 16 continues deeper into housing 18, moving connected base plate 36 along the axis of motion of drawer 16, which remains coupled to facade 14 by the spring force of spring 34. The relative distance of the inner surface of facade 14 and the end of drawer 16 is thus greater in the closed position than in the open position.

Figure 4:
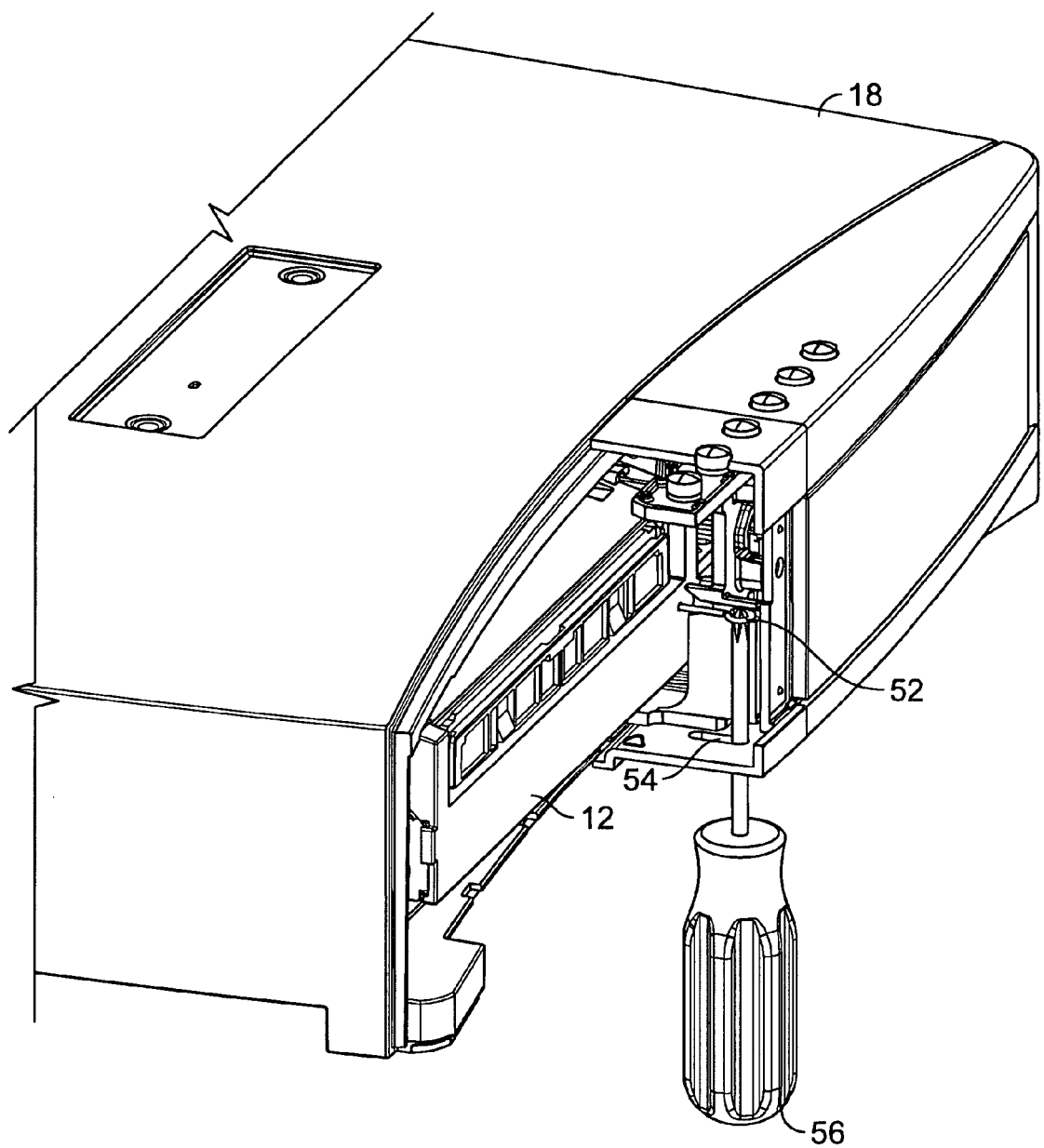
FIG. 4 shows a media drawer with facade removed to illustrate a manual release.

Typically drawer 16 opens and closes by a motorized drive. However, referring to FIG. 4, housing 18 may further include a release pin 52 positioned behind facade 14 to permit a user to manually eject drawer 16 should the motorized ejection mechanism of drawer 16 fail. Release pin 52 may be positioned behind facade 14 to preserve the aesthetic appearance of facade 14, with one end of release pin 52 in communication with disc media drive 12 such that actuating release pin 52 causes drawer 16 to open. Housing 18 may have a second opening 54 in housing 18 to permit access to release pin 52. Release pin 52 may be actuated with a tool 56 inserted into second opening 54, which may be any tool, pin, rod, or other device or element capable of reaching and actuating release pin 52. Release pin 52 may have a portion formed to receive such a tool, such as a looped portion, to permit actuation. Housing 18 may further have a support to support release pin 52, and to maintain it in an orientation permitting actuation.

It is evident that those skilled in the art may now make numerous uses and modifications of and departures from the apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Media player facing apparatus comprising:
a device housing having an outer surface with at least one opening;
a drawer configured to receive media and movable through said at least one opening into said housing;
said drawer being movable between a closed position and an open position;
a facade having an inner surface and an outer surface; and
a compliance for coupling said inner surface of said facade with one end of said drawer constructed and arranged to establish the relative distance of said inner surface of said facade and said one end of said drawer to be greater in said closed position than in said open position.

2. Media player facing apparatus in accordance with claim 1 wherein said outer surface of said device housing is constructed and arranged to establish said outer surface of said facade to be substantially aligned with said media player outer surface when said drawer in is in said closed position.

3. Media player facing apparatus in accordance with claim 1 wherein when said drawer is in said closed position, said outer surface of said facade and said outer surface of said device housing are aligned so that said facade outer surface and said device housing outer surface are substantially continuous.

4. Media player facing apparatus in accordance with claim 1 wherein said inner surface of said facade further comprises at least one guide member;
and wherein said outer surface of said device housing further comprises at least one guide slot corresponding to said at least one guide member so that when said facade is in said closed position said at least one guide member mates with said at least one guide slot.

5. Media player facing apparatus in accordance with claim 1 wherein said compliance further comprises:
a base plate coupled to one end of said drawer; and
a spring in communication with said base plate and coupled to said facade to establish said inner surface of said facade and said one end of said drawer to be greater in said closed position than in said open position.

6. Media player facing apparatus in accordance with claim 5 wherein said spring further comprises:
a coil portion coupled to said facade; and
at least one arm portion extending from said coil portion;
said at least one arm portion in communication with said base plate.

7. Media player facing apparatus comprising,
a device housing having an outer surface with a first opening and a second opening;
said housing further having a faceplate constructed and arranged to create a substantially continuous surface with said housing;
a drawer constructed and arranged to receive media and movable through said first opening into said device housing between a closed position and an open position;
a base plate connected to one end of said drawer;
a spring having a coil portion and at least one arm;
said at least one arm coupled to said base plate;
a facade having an inner surface coupled to said coil portion and an outer surface,
said apparatus constructed and arranged so that the relative distance between said inner surface of said facade and said one end of said drawer is greater in said closed position than in said open position and in the closed position said outer surface of said facade and said outer surface of said device housing are aligned so that said facade outer surface and said device housing outer surface are substantially continuous.

* * * * *